Jan. 30, 1934. E. H. ROWELL 1,944,905
INSTRUMENT PANEL
Filed April 6, 1932
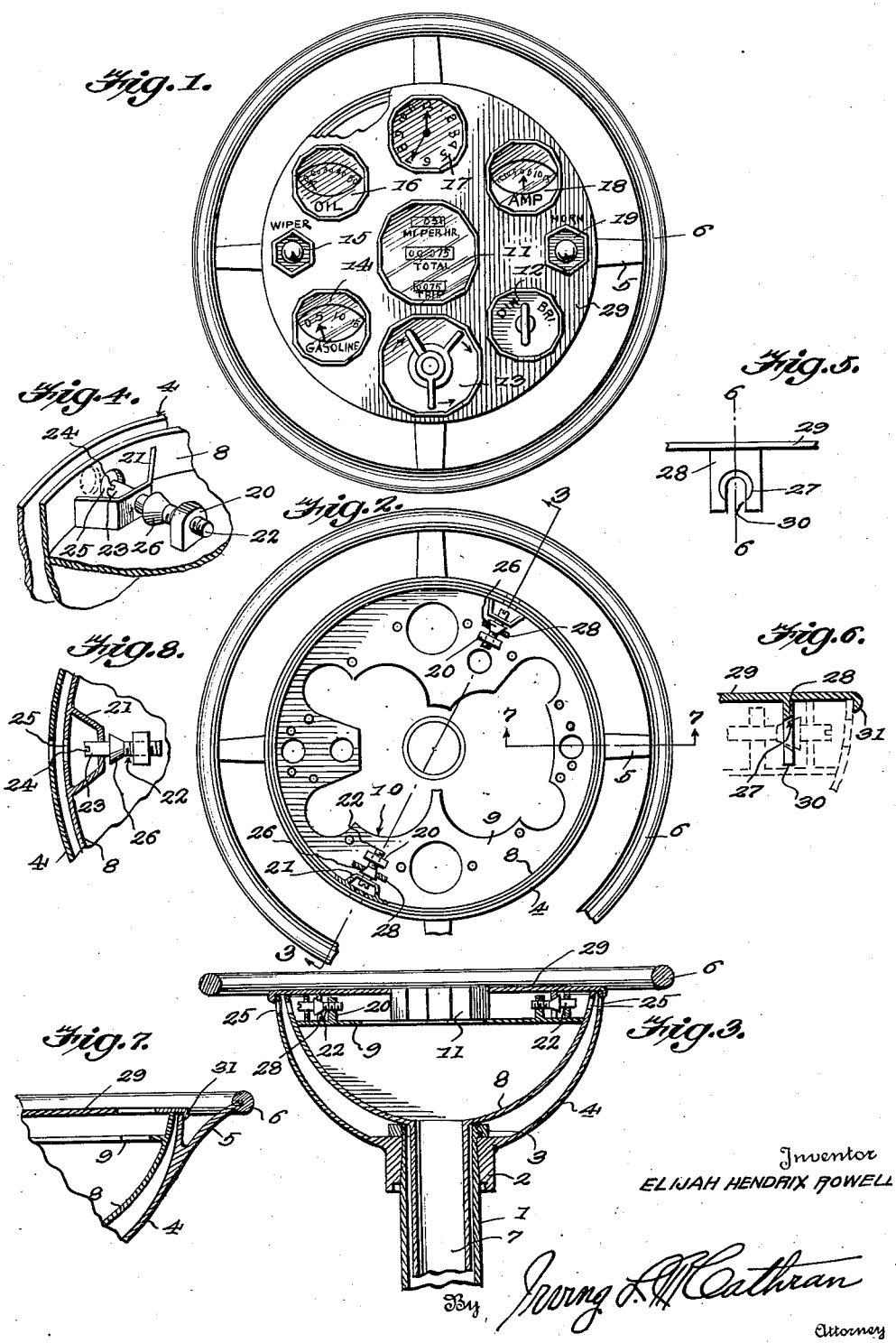
Inventor
ELIJAH HENDRIX ROWELL Patented Jan. 30, 1934

1,944,905

UNITED STATES PATENT OFFICE 1,944,905

INSTRUMENT PANEL

Elijah Hendrix Rowell, Tampa, Fla.

Application April 6, 1932. Serial No. 603,635

6 Claims. (Cl. 180—78)

This invention relates to instrument panels and has for its object the production of a simple and efficient means for supporting an instrument panel directly upon the steering wheel in such a manner as to permit all of the instruments to be readily and conveniently examined and seen by the driver of an automobile.

Another object of this invention is the production of a simple and efficient means for supporting the instrument panel upon the steering wheel and also the provision of an efficient means which will facilitate the attachment of the instrument panel to the steering wheel.

With these and other objects in view, this invention consists of certain novel constructions, combinations and arrangements of parts as will be hereinafter fully described and claimed.

In the drawing:—

Figure 1 is a top plan view of a steering wheel showing the instrument panel mounted thereon;

Figure 2 is a top plan view of a steering wheel partly broken away, the cover-plate being removed showing the instrument supporting plate which is carried within the steering wheel;

Figure 3 is a section taken on line 3—3 of Figure 2;

Figure 4 is a sectional perspective view of a portion of the steering wheel and instrument panel supporting means illustrating in detail one of the securing screws which is adapted to support the cover-plate upon the steering wheel;

Figure 5 is an edge elevation of the cover-plate showing one of the stud straps used for clamping the cover-plate in engagement with the instrument panel supporting plate;

Figure 6 is a section taken on line 6—6 of Figure 5;

Figure 7 is a section taken on line 7—7 of Figure 2, the cover-plate being shown in position; and Figure 8 is a horizontal sectional view through one side of the steering wheel bell-housing and the instrument supporting housing, illustrating the supporting screw guiding strap.

By referring to the drawing, it will be seen that 1 designates the steering wheel supporting shaft which engages the steering wheel collar 2 in any suitable or desired manner and is secured thereto in the conventional manner by means of a suitable nut 3. This steering wheel collar 2 supports a bell-shaped housing 4, which bell-shaped housing 4 is provided with a plurality of outwardly projecting angularly extending arms 5, which arms 5 support the steering rim 6. The arms 5 project from the steering wheel bell-shaped housing 4 at a point below the upper edge of the housing 4, as clearly shown in Figure 7.

Within the steering wheel supporting shaft or housing 1 is mounted a tubular supporting member 7 which is preferably anchored at its lower end in any suitable or desired manner and may be secured to the body of the automobile in any manner common to the trade. The upper end of this supporting tube 7 is integrally secured or welded to an inner bell-shaped housing 8, which inner bell-shaped housing 8 carries an instrument supporting panel or plate 9, this plate 9 being welded or integrally secured to the inner bell-shaped housing 8, as clearly shown in Figure 7. The instrument supporting plate 9 is provided with a plurality of cut-out portions 10 suitably constructed to support the various instruments which are common to an automobile and which are usually supported on the instrument panel directly below the windshield. The purpose of this invention, however, is to conveniently and efficiently support the various instruments within the center of the steering wheel in order that all of the instruments may be readily viewed without being hidden from the vision of the driver of the automobile. Mounted upon this plate 9 are preferably the speedometer 11, the lighting or dimming switch 12, the throttle and start control 13, the gasoline gauge 14, the wiper control switch 15, the oil gauge 16, the clock 17, the ammeter 18, and the horn switch 19. The number of these instruments may be increased or diminished to suit the convenience of the particular type of automobile upon which the device may be mounted.

This instrument supporting plate 9 carries a plurality of upwardly extending internally threaded studs 20 arranged in suitable spaced relation upon the upper face of the plate 9, and a plurality of spaced brackets 21 are secured to the inner face of the inner bell-shaped housing 8, near the upper edge thereof and above the plate 9, these brackets 21 being arranged in alignment with the internally threaded stud blocks 20, as shown. A suitable cover-plate securing screw 22 is threaded through each stud block 20, as shown in the drawing, the shank 23 passing through the guiding bracket 21 and having a notch 24 to permit engagement of the shank by means of a screw-driver to rotate the securing screw 22. The outer bell-shaped housing 4 and the inner bell-shaped housing 8 are provided with aligned apertures 25 to permit the entrance of a screw-driver for actuating the securing screws 22.

In assembling the device, it should be understood that the apertures 25 may be brought into registration by properly turning the steering wheel to the desired position. Each securing screw 22 is provided with a cone-shaped friction grip 26 intermediate the end thereof, which cone-shaped friction grip 26 is adapted to fit in the bevelled notch 27 of the depending stud straps 28 which are secured to the underface of the cover-plate 29. These stud straps 28 are bifurcated at their lower ends as indicated at 30, in Figure 5, to permit the cover-plate to be easily dropped over the securing screws 22, and by rotating these securing screws 22 through the medium of a screw-driver the cone-shaped portions 26 may be forced frictionally into engagement with the bevelled notches 27 of the stud straps 28 and thereby frictionally hold the cover-plate 29 in engagement with the inner bell-shaped housing 8, and firmly anchored in engagement therewith. The cover-plate 29 is provided with suitable openings to correspond with the instruments carried by the instrument supporting plate 9 in order to permit the instruments to be readily viewed through the cover-plate and also to permit those instruments which must be operated or actuated by the operator to be easily engaged. The cover-plate 29 is provided with an overhanging flange 31 along its periphery, which overhanging flange 31 is adapted to overhang the outer upper end of the bell-shaped housing 4 and prevent the lateral shifting of the cover-plate with respect to the outer bell-shaped housing 4. This rim 31, however, will permit the free rotation of the outer housing with respect to the anchored or stationary bell-shaped housing 8, as will be obvious.

From the foregoing description, it will be seen that a very simple and efficient means has been provided for supporting an instrument panel directly in the center of a steering wheel whereby the various instruments may be readily viewed by the driver of a machine. By means of the well known type of instrument panels, wherein the instruments are placed upon the panel directly below the windshield, very often the various instruments are shielded from the view of the driver by means of the steering wheel and the supporting spokes therefor. In the present instance, however, the various instruments are mounted directly upon the top and center of the steering wheel and may at all times be readily viewed by the driver of the machine. The various instruments will remain in their proper positions, and will not change their relative positions as the steering wheel is being rotated, due to the fact that the rim 6 may be readily swung in steering the automobile, the instrument panel being anchored and supported upon the supporting tube or standard 7 whereas the outer wheel may be freely rotated by being secured to the steering post 1. Furthermore it should be understood that a very simple and efficient means has been provided for securing the cover-plate to the inner bell-shaped housing 8 and that there will be no obstructions extending from this housing or from the outer bell-shaped housing 4, all the securing means being mounted upon the interior, in this way permitting the free operation of the steering wheel without being obstructed in its rotation.

It should be understood that certain detail changes in the mechanical construction may be employed without departing from the spirit of the invention, so long as these changes fall within the scope of the appended claims.

Having described the invention what is claimed as new is:—

1. In combination with a steering wheel, a support, said steering wheel provided with a bell-shaped housing, an inner bell-shaped housing mounted within said first mentioned bell-shaped housing, a supporting tube anchoring said inner bell-shaped housing, an instrument panel carried by said inner bell-shaped housing, and a removable cover-plate carried by said inner bell-shaped housing and overhanging the upper end of said outer bell-shaped housing.

2. An instrument panel supporting means for steering wheels and the like comprising an inner instrument panel supporting plate, means for anchoring said instrument panel supporting plate against movement, a cover-plate for said instrument panel supporting plate removably secured to said instrument panel supporting plate, studs carried by said instrument panel supporting plate, securing screws carried by said studs, apertured stud straps carried by said cover-plate and fitting over said screws, and means carried by said screws for engaging said apertured stud plates for detachably securing said cover-plate in engagement with said instrument panel supporting plate.

3. In combination with a steering wheel, a support, a collar carried by said support, an outer bell-shaped housing carried by said collar; outwardly flaring arms carried by said outer bell-shaped housing, a rim supported by said arms in spaced relation with respect to said outer bell-shaped housing, an inner bell-shaped housing, means for anchoring said inner bell-shaped housing against movement, an instrument panel supporting plate carried by said inner bell-shaped housing, instruments mounted upon said instrument panel supporting plate, a cover-plate detachably secured to said instrument panel supporting plate and overhanging said outer bell-shaped housing, said cover-plate provided with depending flanges at the periphery thereof for overhanging the upper edge of said outer bell-shaped housing, and means mounted wholly within said inner bell-shaped housing for securing said cover-plate in engagement with said inner bell-shaped housing.

4. In combination with a steering wheel, a support for said wheel, a collar carried by said support, an outer bell-shaped housing carried by said collar, outwardly flaring arms carried by said outer bell-shaped housing, a rim supported by said arm in spaced relation with respect to said outer bell-shaped housing, an inner bell-shaped housing, means for anchoring said inner bell-shaped housing against movement, an instrument panel supporting plate carried by said inner bell-shaped housing, instruments mounted upon said instrument panel supporting plate, said cover-plate provided with depending flanges at the periphery thereof for overhanging the upper edge of said outer bell-shaped housing, means mounted wholly within said inner bell-shaped housing for securing said cover-plate in engagement with said inner bell-shaped housing, said last mentioned means comprising supporting studs, threaded screws mounted through said supporting studs, said threaded screws provided with outer unthreaded shanks, each screw provided with a cone-shaped friction grip, cover-plate provided with depending aperture stud straps fitting over said cone-shaped portions of said threaded screws, said cone-shaped portions of said threaded screws adapted to frictionally secure said cover-plate in a set position upon said steering wheel, and said inner and outer housings having aligned apertures to facilitate the operation of said screws for securing said cover-plate in a set position upon said inner bell-shaped housing.

5. A device of the class described comprising an inner housing and an outer housing, an instrument panel supporting plate mounted upon said inner housing, a cover-plate, a guiding bracket carried by the inner face of said inner housing, a stud carried by said instrument panel supporting plate, a screw mounted upon said stud, and passing through said guiding bracket, a cone-shaped gripping portion formed upon said screw, said cover-plate provided with a depending apertured stud strap fitting over said cone-shaped portion of said screw, said cone-shaped portion of said screw being adapted to frictionally secure said cover-plate upon said instrument panel plate, and said cover-plate provided with viewing apertures formed therein to permit said instruments carried by said instrument panel supporting plate to be viewed by an operator.

6. In combination with a steering wheel, a support, said steering wheel being provided with a housing, an inner housing mounted within said first mentioned housing, a supporting tube anchoring said inner housing, an instrument panel carried by said inner housing, and a removable cover carried by said inner housing and overhanging the upper end of said outer housing.

ELIJAH HENDRIX ROWELL.